United States Patent [19]

Kawasaki

[11] Patent Number: 5,467,476
[45] Date of Patent: Nov. 14, 1995

[54] SUPERSCALAR PROCESSOR HAVING BYPASS CIRCUIT FOR DIRECTLY TRANSFERRING RESULT OF INSTRUCTION EXECUTION BETWEEN PIPELINES WITHOUT BEING WRITTEN TO REGISTER FILE

[75] Inventor: Takashi Kawasaki, Tokyo, Japan

[73] Assignee: Kabushiki Kaisha Toshiba, Kawasaki, Japan

[21] Appl. No.: 293,164

[22] Filed: Aug. 19, 1994

Related U.S. Application Data

[63] Continuation of Ser. No. 874,135, Apr. 27, 1992, abandoned.

[30] Foreign Application Priority Data

Apr. 30, 1991 [JP] Japan ..................................... 3-099132

[51] Int. Cl.⁶ ................................. G06F 9/34; G06F 9/22
[52] U.S. Cl. .................... 395/800; 395/375; 364/DIG. 1; 364/231.8; 364/240.7; 364/243.43
[58] Field of Search ...................................... 395/375, 800

[56] References Cited

U.S. PATENT DOCUMENTS

| | | | |
|---|---|---|---|
| 4,541,046 | 9/1985 | Nagashima et al. | 395/375 |
| 4,626,989 | 12/1986 | Torii | 395/375 |
| 4,639,866 | 1/1987 | Loo | 395/550 |
| 4,742,454 | 5/1988 | Robinson et al. | 395/200 |
| 4,782,441 | 11/1988 | Inagami et al. | 395/800 |
| 4,851,990 | 7/1989 | Johnson et al. | 395/325 |
| 5,051,940 | 9/1991 | Nassiliadis et al. | 364/736 |
| 5,067,069 | 11/1991 | Fite et al. | 395/375 |
| 5,123,108 | 6/1992 | Olson et al. | 395/800 |
| 5,133,077 | 7/1992 | Karne et al. | 395/800 |
| 5,222,240 | 6/1993 | Patel | 395/775 |
| 5,333,284 | 7/1994 | Nugent | 395/375 |

OTHER PUBLICATIONS

Popescu et al; "The Metaflow Architecture"; IEEE Micro, Jun. 1991, pp. 10–13, 63–73.

Smith et al; "Implementing Precise Interrupts In Pipelined Processors"; IEEE Transactions on Computer, vol. 37, No. 5, May 1988, pp. 562–573.

*Primary Examiner*—Krisna Lim
*Attorney, Agent, or Firm*—Finnegan, Henderson, Farabow, Garrett & Dunner

[57] ABSTRACT

In a superscalar parallel processor, the execution time for instructions can be reduced, and the performance of instruction processing can be improved. A superscalar parallel processor having a plurality of pipelines arranged to parallelly execute a maximum of N (N>1) instructions includes a bypass circuit for transferring a data output of each step of at least two pipelines between the pipelines.

4 Claims, 4 Drawing Sheets

| | INSTRUCTION 1 | add | $3, $1, $2 | ($1 + $2 → $3) |
|---|---|---|---|---|
| | INSTRUCTION 2 | add | $6, $4, $5 | ($4 + $5 → $6) |
| | INSTRUCTION 3 | or | $7, $3, $6 | ($3 ∨ $6 → $7) |
| | INSTRUCTION 4 | and | $7, $3, $6 | ($3 ∧ $6 → $8) |

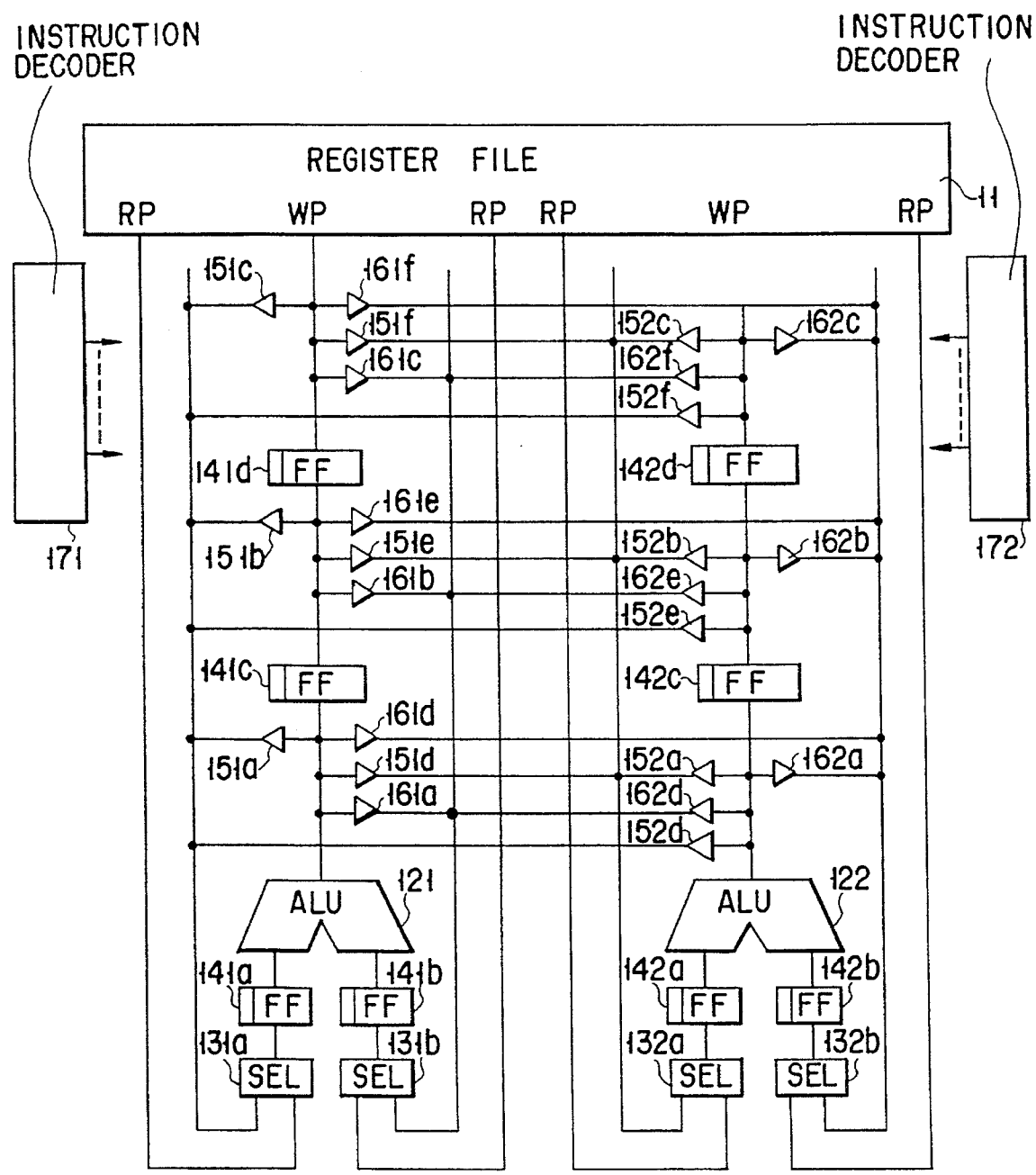
F I G. 6

SUPERSCALAR PROCESSOR HAVING BYPASS CIRCUIT FOR DIRECTLY TRANSFERRING RESULT OF INSTRUCTION EXECUTION BETWEEN PIPELINES WITHOUT BEING WRITTEN TO REGISTER FILE

This application is a continuation of application Ser. No. 07/874,135, filed Apr. 27, 1992, now abandoned.

BACKGROUND OF THE INVENTION

1. Field of the Invention

The present invention relates to an RISC (Reduced Instruction Set Computer) microprocessor and, more particularly, to a parallel processor system for parallelly processing a plurality of instructions using a superscalar method.

2. Description of the Related Art

In a conventional data processor, a SISD (Single Instruction Single Data) method for sequentially processing single instructions is usually used. For improving the performance of the processor, the following countermeasures are provided. The width of processable data is increased, and the operating frequency is increased. In addition, a pipeline method for simultaneously processing a plurality of data by dividing the processing itself into several sections is used, or a hardware used for special processing such as floating-point arithmetic is added.

FIG. 1 is a conventional pipeline processor having only one operating unit. Reference numeral 51 denotes a register file. Reference symbol RP denotes a read port of the register file 51; and WP, a write port of the register file 51. Reference numeral 52 denotes an arithmetic and logic unit (to be referred to as an ALU hereinafter); 531 and 532, two-input selector circuits; 54a to 54d, flip-flop circuits; 55a to 55c and 56a to 56c, tri-state buffer circuits; and 17, an instruction decoder.

In this pipeline processor, when instructions 1 to 4 shown in FIG. 2 are to be executed, as shown in FIG. 3, instruction decode D, instruction execute E, memory access M, and register write W of the instruction 1 are sequentially executed in four steps I to IV, the instruction 2 is executed in steps II to V, the instruction 3 is executed in steps III to VI, and the instruction 4 is executed in steps IV to VII. Therefore, a total of 7 cycles are required for writing the operation result in the register.

In order to further improve the performance of a processor, an MIMD (Multiple-instruction structure Multiple-data stream) method for simultaneously (parallelly) executing a plurality of instructions can effectively be used. In this method, a plurality of operation processing units are arranged, and these units are simultaneously operated. For example, there are an array processor having an array of identical operating units and a superscalar parallel processor having a plurality of different operating units and having a plurality of pipelines.

Since it is difficult to apply the former to general data processing, the application field of the processor is limited. In contrast to this, since the control method of the superscalar processor corresponds to the extension of the control method of a conventional processor, the superscalar processor can be relatively easily applied to general data processing.

In the superscalar parallel processor, a plurality of instructions are parallelly executed for 1 clock (cycle) by simultaneously operating a plurality of operating units. In this case, in processing the instruction, the plurality of instructions are simultaneously fetched/decoded by the operating units. For this reason, the superscalar parallel processor has a processing capacity larger than that of a conventional processor.

FIG. 4 shows a conventional superscalar parallel processor having two operating units and two pipelines arranged to parallelly execute two instructions.

In FIG. 4, reference numeral 71 denotes a register file, and reference symbols RP and WP denote a read port and a write port of the register file 71, respectively. Reference numerals 721 and 722 denote ALUs; 731a, 731b, 732a, and 732b, two-input selector circuits; 741a to 741d and 742a to 742d, flip-flop circuits; 751a to 751c, 761a to 761c, 752a to 752c, and 762a to 762c, tri-state buffer circuits; and 771 and 772, instruction decoders.

When this parallel processor is to execute instructions 1 to 4 (shown in FIG. 2), as shown in FIG. 5, instruction decode D, instruction execute E, memory access M, and register write W of the instructions 1 and 2 are sequentially executed in four steps I to IV, and instruction decode D, instruction execute E, memory access M, and register write W of the instructions 3 and 4 are sequentially executed in four steps V to VIII.

At this time, until the operation result of the instructions 1 and 2 are written in the register, instructions 3 and 4 cannot be executed. Therefore, a time required for writing the operation result of the instructions 3 and 4 in the register is 8 cycles obtained by summing 4 cycles required for executing the instructions 1 and 2 and 4 cycles required for executing the instructions 3 and 4.

Therefore in the above conventional superscalar parallel processor, although hardware is increased, when the number of instructions to be executed is larger than the number of instructions which can be parallelly executed, until the operation result of an instruction is written in the register, another instruction cannot be executed. As a result, the execution time for the instructions may be increased.

In other words, in the conventional superscalar parallel processor, when instructions having a number larger than the number of instructions which can be parallelly executed are to be executed, the execution time for the instructions may be increased.

SUMMARY OF THE INVENTION

The present invention has been made to solve the above problems, and has as its object to provide the development of a superscalar parallel processor capable of decreasing execution time for instructions and improving the performance of instruction processing.

According to the present invention, a superscalar parallel processor has a plurality of pipelines arranged to be able to parallelly execute a maximum of N (N>1) instructions. It comprises a bypass circuit for transferring a data output of each step of at least one instruction pipeline to and from the other instruction pipelines.

Before the operation result of an arbitrary step of an instruction pipeline is written in a register file, the operation result can be used as an operand of another operation by transferring the operation result to another instruction pipeline. Therefore, even when instructions having a number larger than the number of instructions which can be parallelly executed are to be executed, the execution time of the instruction is decreased, and the performance of instruction processing can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 6 is a logical circuit diagram showing pipelines of a superscalar parallel processor according to an embodiment of the present invention;

DETAILED DESCRIPTION OF THE PREFERRED EMBODIMENTS

Figures 1, 2:
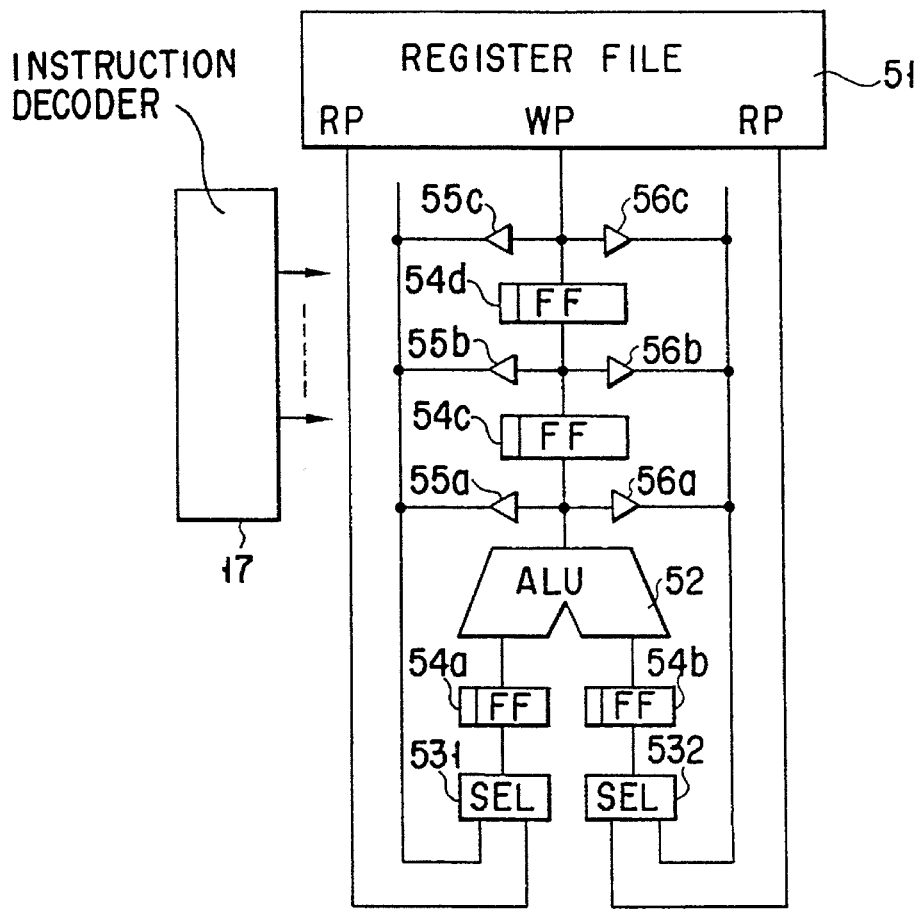
FIG. 1 is a logical circuit diagram showing a conventional pipeline processor having only one operating unit.
FIG. 2 is a view for explaining instructions 1 to 4 which are parallelly executed in a parallel processor in FIG. 6.
Figure 3:
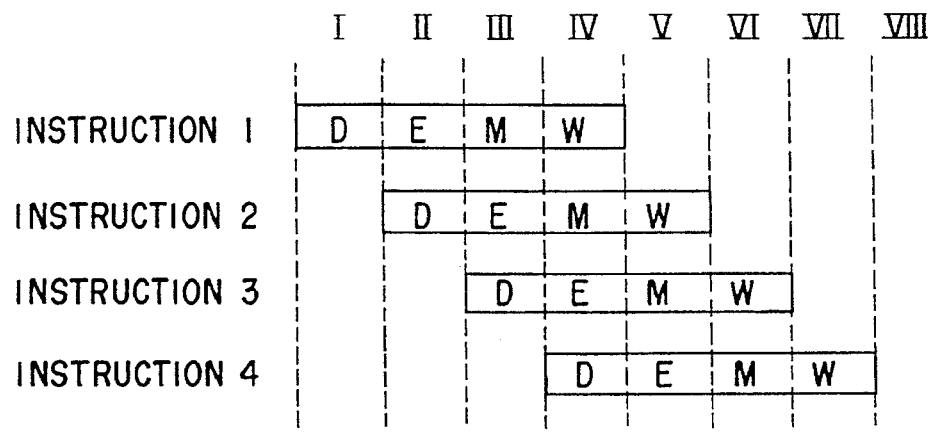
FIG. 3 is a view showing the conditions of steps when the instructions 1 to 4 in FIG. 2 are executed in the pipeline processor in FIG. 1.

An embodiment of the present invention will be described below with reference to the accompanying drawings.

FIG. 6 shows a part of a superscalar parallel processor. This parallel processor has a plurality (e.g., two) of operating units and a plurality (in this embodiment, two) of instruction pipelines. The pipelines are arranged such that a maximum of two instructions can be parallelly executed for one clock by simultaneously operating the two operating units.

In FIG. 6, reference numeral 11 denotes a register file, and reference symbols RP and WP denote a read port and a write port of the register file 11, respectively. Reference numerals 121 and 122 denote ALUs; 131a, 131b, 132a, and 132b, two-input selector circuits; 141a to 141d and 142a to 142d, flip-flop circuits; 151a to 151f, 161a to 161f, 152a to 152f, and 162a to 162f, tri-state buffer circuits; and 171 and 172, instruction decoders.

All the elements shown in FIG. 6 are formed on a single semiconductor chip.

Figures 5, 7, 8:
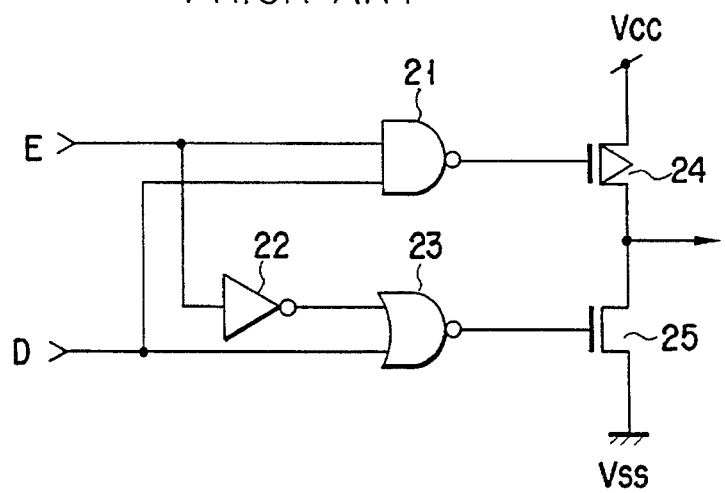
FIG. 5 is a view showing the conditions of each step when the instructions 1 to 4 in FIG. 2 are executed in the parallel processor in FIG. 4.
FIG. 7 is a circuit diagram showing a tri-state buffer circuit in FIG. 6.
FIG. 8 is a view showing the conditions of steps when the instructions 1 to 4 in FIG. 2 are executed in the parallel processor in FIG. 6.

FIG. 7 shows one circuit selected from the tri-state buffer circuits 151a to 151f, 161a to 161f, 152a to 152f, and 162a to 162f. Reference symbol Vcc denotes a power source potential; Vss, a ground potential; D, input data from the instruction pipeline; and E, an activating (enable) control signal from the instruction decoder 171 or 172. Reference numeral 21 denotes a two-input NAND gate; 22, an inverter circuit; 23, a two-input NOR gate; 24, a PMOS transistor; and 25, an NMOS transistor. When the enable control signal E is set to be "H" level, and the input data D is set to be "H" level, an output from the two-input NAND gate 21 goes to "L" level, an output from the two-input NOR gate 23 goes to "L" level, the PMOS transistor 24 is turned on, the NMOS transistor 25 is turned off, and a buffer output goes to "H" level.

In contrast to this, when the input data D goes to "L" level, the output from the two-input NAND gate 21 goes to "H" level, the output from the two-input NOR gate 23 goes to "H" level, the PMOS transistor 24 is turned off, the NMOS transistor 25 is turned on, and the buffer output goes to "L" level.

On the other hand, when the enable control signal E is set to be "L" level, the output from the two-input gate 21 goes to "H" level independently of the level of the input data D, the output from the two-input NOR gate 23 goes to "L" level independently of the level of the input data D, and the PMOS transistor 24 and the NMOS transistor 25 are turned off, thereby setting the buffer output in a high-impedance state.

When the instructions 1 to 4 shown in FIG. 2 are to be executed in the above parallel processor, as shown in FIG. 8, the parallel processor is controlled as follows. Instruction decode D, instruction execute E, memory access M, and register write W of the instructions 1 and 2 are sequentially executed in four steps I to IV, and instruction decode D, instruction execute E, memory access M, and register write W of the instructions 3 and 4 are sequentially executed in four steps II to V.

In step I, in response to the instruction 1, register values $1 and $2 are read from the register file 11, and they are stored in the flip-flop circuits 141a and 141b through the two-input selector circuits 131a and 131b, respectively. In response to the instruction 2, register values $4 and $5 are read from the register file 11, and they are stored in the flip-flop circuits 142a and 142b through the two-input selector circuits 132a and 132b, respectively.

In step II, in response to the instruction 1, an addition of $1+$2 is executed by the ALU 121, and the resultant value $3 is stored in the flip-flop circuit 141c. In response to the instruction 2, an addition of $4+$5 is executed by the ALU 122, and the resultant value $6 is stored in the flip-flop circuit 142c. At this time, these resultant values $3 and $6 are not written in the register file 11.

In response to the instruction 3, the operation result $3 of the ALU 121 is stored in the flip-flop circuit 141a as an operand through the tri-state buffer circuit 151a and the two-input selector circuit 131a, and the operation result $6 of the ALU 122 is stored in the flip-flop circuit 141b as an operand through the tri-state buffer circuit 162d and the two-input selector circuit 131b.

In response to the instruction 4, the operation result $3 of the ALU 121 is stored in the flip-flop circuit 142a as an operand through the tri-state buffer circuit 151d and the two-input selector circuit 132a, and the operation result $6 of the ALU 122 is stored in the flip-flop circuit 142b as an operand through the tri-state buffer circuit 162a and the two-input selector circuit 132b.

In step III, in response to the instruction 1, the operation result $3 of the instruction 1 stored in the flip-flop circuit 141c is transferred to the flip-flop circuit 141d. In response to the instruction 2, the operation result $6 stored in the flip-flop circuit 142c is transferred to the flip-flop circuit 142d.

In response to the instruction 3, an OR operation of the operation results $3 and $6 is executed by the ALU 121, and the resultant value $7 is stored in the flip-flop circuit 141c. In response to the instruction 4, an OR operation of the operation results $3 and $6 is executed, and the resultant value $8 is stored in the flip-flop circuit 142c.

In step IV, the operation result $3 of the instruction 1 stored in the flip-flop circuit 141d is written in the register 11, and the operation result $6 of the instruction 2 stored in the flip-flop circuit 142d is written in the register file 11.

In response to the instruction 3, the operation result $7 of the instruction 3 stored in the flip-flip circuit 141c is transferred to the flip-flip circuit 141d. In response to the instruction 4, the operation result $8 stored in the flip-flip circuit 142c is transferred to the flip-flop circuit 142d.

In step V, the operation result $7 of the instruction 3 stored in the flip-flop circuit 141d is written in the register 11, and the operation result $8 of the instruction 4 stored in the flip-flop circuit 142d is written in the register file 11.

Figure 4:
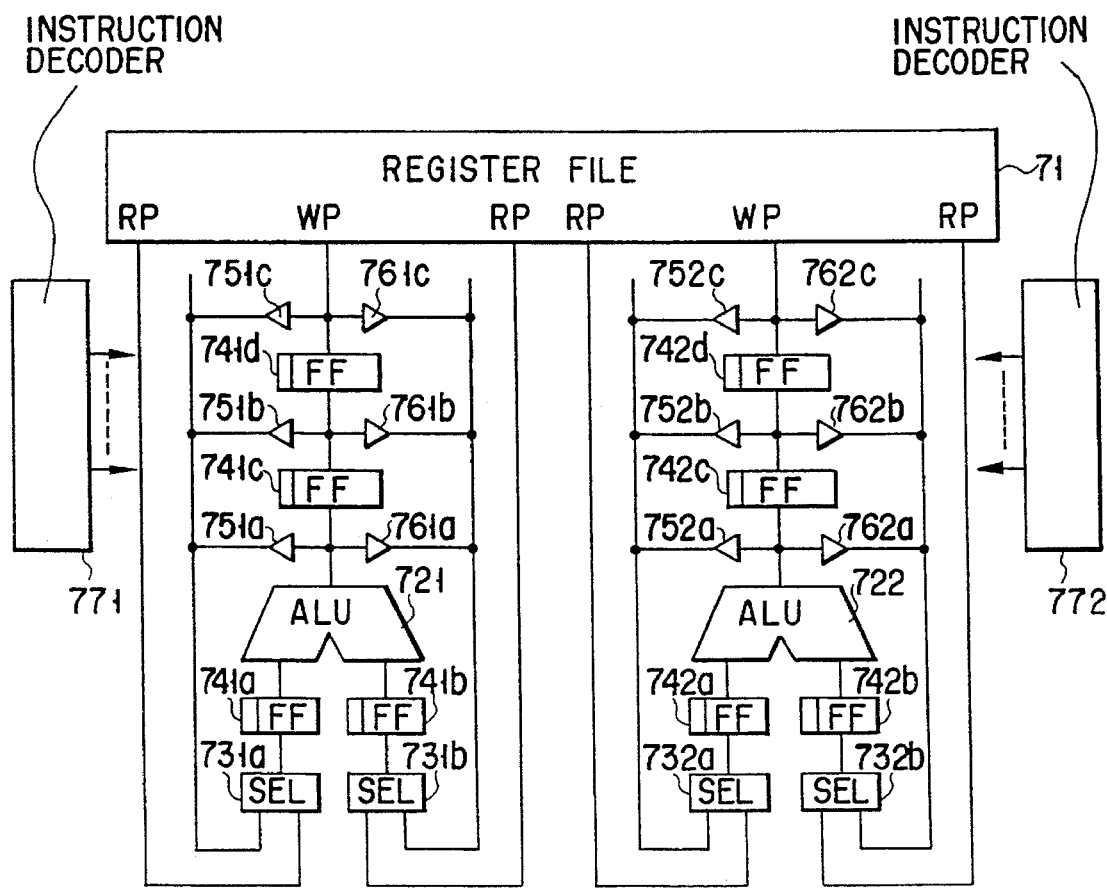
FIG. 4 is a logical circuit diagram showing two pipelines in a conventional superscalar parallel processor in the case where two operating units are provided.

Therefore, the time required for writing the operation results of the instructions 3 and 4 is a total of 5 cycles. The 5 cycles are less by 3 cycles compared with the required time, i.e., 8 cycles, in the conventional parallel processor shown in FIG. 4.

According to the above embodiment, the parallel processor comprises a bypass circuit (the tri-state buffer circuits 151a to 151f, 161a to 161f, 152a to 152f, and 162a to 162f) for transferring a data output of each step of two instruction pipelines.

By virtue of this circuit, before an operation result of an arbitrary step of one instruction pipeline is written in the register file, the operation result is brought in to another instruction pipeline, and, therefore, the operation result can be used as the operand of another operation.

Therefore, when instructions having a number larger than the number of instructions which can be parallelly executed are to be executed, the execution time for the instructions is decreased, and the performance of instruction processing can be remarkably improved.

When the bypass circuit is placed on the same semiconductor chip as that of an instruction execution operating unit, the system arrangement of the parallel processor can be simplified.

As described above, in the superscalar parallel processor according to the present invention, the execution time for instructions can be reduced, and the performance of instruction processing can be improved.

In the pipelines, stages are respectively formed between the ALUs 121 and 122 and the flop-flop circuits 141c and 142c, between the flip-flop circuits 141c and 142c and the flip-flip circuits 141d and 142d, and between the flip-flop circuits 141d and 142d and the write port WP of the register file 11.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A superscalar processing system for parallelly processing a plurality of instructions using a superscalar method, comprising:

first and second instruction execution operating units;

a register file having first and second read ports and first and second write ports; and first and second instruction decoders, said first and second instruction decoders responding to said first and second instruction execution operating units, respectively;

said first instruction execution operating unit including:
   a first pipeline having a first terminal connected to said first write port,
   a first arithmetic and logic unit having an output port connected to a second terminal of said first pipeline,
   two two-input selector circuits for selectively receiving data to be processed in accordance with instructions,
   two flip-flop circuits, each positioned between respective ones of said two-input selector circuits and an input port of said first arithmetic and logic unit, and
   a first group of flip-flop circuits arranged on said first pipeline for storing data;

said second instruction execution operating unit including:
   a second pipeline having a first terminal connected to said second write port,
   a second arithmetic and logic unit having an output port connected to a second terminal of said pipeline,
   two two-input selector circuits for selectively receiving data to be processed in accordance with instructions,
   two flip-flop circuits, each positioned between respective ones of said two-input selector circuits and an input port of said second arithmetic and logic unit, and
   a second group of flip-flop circuits arranged on said second pipeline for storing data;

a first group of bypass circuits, each connecting said first pipeline to one of said two two-input selection circuits of said second instruction execution operating unit, for transferring data stored in said first group of flip-flop circuits to said one of said two two-input selection circuits of said second instruction execution operating unit; and a second group of bypass circuits, each connecting said second pipeline to one of said two two-input selection circuits of said first instruction execution operating unit, for transferring data stored in said second group of flip-flop circuits to said one of said two two-input selection circuits of said first instruction execution operating unit.

2. A system according to claim 1, wherein said instruction execution operating units, said register file and said instruction decoders are formed on a common semiconductor chip.

3. A system according to claim 1, wherein each of said first group of said bypass circuits comprises a tri-state buffer circuit.

4. A system according to claim 1, wherein each of said second group of said bypass circuits comprises a tri-state buffer circuit.

* * * * *